(12) United States Patent
Tartarin et al.

(10) Patent No.: US 10,138,350 B2
(45) Date of Patent: Nov. 27, 2018

(54) AQUEOUS EMULSION OF DIALKYL PEROXIDE

(71) Applicant: ARKEMA FRANCE, Colombes (FR)

(72) Inventors: Isabelle Tartarin, Oullins (FR); Jacques Cochet, Chanas (FR); Juergen Lohr, Günzburg (DE)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/518,511

(22) PCT Filed: Oct. 14, 2015

(86) PCT No.: PCT/FR2015/052758
§ 371 (c)(1),
(2) Date: Apr. 12, 2017

(87) PCT Pub. No.: WO2016/059342
PCT Pub. Date: Apr. 21, 2016

(65) Prior Publication Data
US 2017/0226318 A1    Aug. 10, 2017

(30) Foreign Application Priority Data

Oct. 17, 2014 (FR) ..................................... 14 59972

(51) Int. Cl.
C08F 2/22 (2006.01)
C08K 5/14 (2006.01)
C08F 14/04 (2006.01)

(52) U.S. Cl.
CPC ................ *C08K 5/14* (2013.01); *C08F 2/22* (2013.01); *C08F 14/04* (2013.01)

(58) Field of Classification Search
CPC .... C08F 2/22; C08F 14/04; C08K 5/14; B01J 13/08; B01F 17/00; B01F 17/0021
USPC .......................... 516/74; 252/186.26, 186.42
See application file for complete search history.

(56) References Cited

U.S. PATENT DOCUMENTS

| | | | |
|---|---|---|---|
| 3,988,261 A | 10/1976 | Barter et al. | |
| 4,039,475 A * | 8/1977 | Oosterwijk | C08F 2/18 502/160 |
| 4,391,876 A * | 7/1983 | Tamosauskas | B01F 17/0028 428/392 |
| 4,440,885 A | 4/1984 | Tamosauskas | |
| 4,842,765 A * | 6/1989 | Satomi | C08F 4/32 502/160 |
| 5,260,390 A * | 11/1993 | Torenbeek | C08F 2/18 502/160 |
| 7,943,685 B2 | 5/2011 | Webster | |
| 8,846,832 B2 * | 9/2014 | DeJong | C08F 4/38 252/186.26 |
| 9,410,002 B2 * | 8/2016 | Tartarin | C08F 4/32 |
| 2004/0249097 A1 * | 12/2004 | Cozens | C08F 4/34 526/230.5 |
| 2005/0171275 A1 * | 8/2005 | DeJong | C07C 407/006 524/563 |
| 2015/0218293 A1 | 8/2015 | Tartarin et al. | |
| 2015/0232590 A1 * | 8/2015 | Tartarin | C08F 14/06 526/200 |
| 2017/0267855 A1 * | 9/2017 | Chang | C08L 23/16 |

FOREIGN PATENT DOCUMENTS

| | | |
|---|---|---|
| AU | 2005202336 A1 * | 12/2006 |
| GB | 2 073 046 A | 10/1981 |
| JP | 2001-064312 A | 3/2001 |
| WO | WO 00/42078 A1 | 7/2000 |
| WO | WO 01/32613 A1 | 5/2001 |
| WO | WO 03/095500 | 11/2003 |
| WO | WO 2011/015567 A2 | 2/2011 |
| WO | WO 2014/044949 A1 | 3/2014 |

OTHER PUBLICATIONS

International Search Report (PCT/ISA/210) dated Jan. 29, 2016, by the European Patent Office as the International Searching Authority for International Application No. PCT/FR2015/052758.
Written Opinion (PCT/ISA/237) dated Jan. 29, 2016, by the European Patent Office as the International Searching Authority for International Application No. PCT/FR2015/052758.

* cited by examiner

*Primary Examiner* — Daniel S Metzmaier
(74) *Attorney, Agent, or Firm* — Buchanan Ingersoll & Rooney P.C.

(57) ABSTRACT

An aqueous emulsion of dialkyl peroxide has at least one dialkyl peroxide in liquid form at room temperature, representing between 10% and 75% by weight of the emulsion, at least one emulsifier representing from 0.01% to 10% by weight of the emulsion, optionally, at least one antifreeze, optionally at least one functional additive, water, the amount of which is determined so as to form the rest of said emulsion (100%), characterized in that the emulsifier is a polyethoxylated nonionic surfactant. Also, a process for preparing this aqueous emulsion.

13 Claims, No Drawings

AQUEOUS EMULSION OF DIALKYL PEROXIDE

FIELD OF THE INVENTION

The invention relates to an aqueous emulsion of dialkyl peroxide, stored at room temperature, comprising a specific emulsifier, namely a polyethoxylated nonionic emulsifier, and more particularly at least one sorbitan ester.

The present invention also relates to the process for preparing such an emulsion and also to the use of this emulsion in applications for which it is particularly intended.

PRIOR ART

Organic peroxides are species that are highly unstable when they are heated. In the event of an uncontrolled increase in temperature, certain organic peroxides risk igniting or exploding violently. This behaviour is therefore incompatible especially with the rules in force for the transportation and storage of hazardous material.

Organic peroxides must therefore be placed in a solvent (phlegmatizer) or in a suspension/emulsion in water in order to be able to be transported (oil-in-water emulsion). The presence of a phlegmatizer (solvent, water) greatly attenuates the violence of the decomposition.

Moreover, the major advantage of emulsions/suspensions of organic peroxides in water lies in the fact that in the event of decomposition, this will take place without a major risk of fire since water constitutes a powerful reserve for absorbing calories, whereas a phlegmatizer (solely solvent, without the presence of water) may catch fire.

Emulsions of liquid organic peroxides in water have been developed essentially for peroxides that must be stored at low temperature. Peroxydicarbonates, certain peroxyesters and diacyl peroxides will be included in particular.

The main application of these highly reactive peroxides with respect to the temperature criterion, conventionally in emulsion form, is the polymerization or copolymerization of ethylenically unsaturated monomers, especially of vinyl chloride.

When organic peroxides have a self-accelerated decomposition temperature (SADT) that is well above room temperature, the advantage of the phlegmatized form (of solvent or water type) may also lie in the saving in storage in terms of the amount of organic peroxide by change of storage category according to the national regulations in force. This may make it possible to conserve in the production unit a larger amount of organic peroxide than when the peroxide is phlegmatized.

Thus, for example, 2,5-dimethyl-2,5-di(tert-butylperoxy-hexane) peroxide in pure form is classified UN3103, i.e. of type C, whereas, when diluted to 50% by mass in a mineral oil, it becomes classified UN3109, i.e. of type F (UN classification "Transport of dangerous goods" relating to peroxides). In the Dutch regulation for the storage of organic peroxides, known as VROM, it is possible to store in metering equipment 5000 liters of a type F peroxide or 100 liters of a type C peroxide.

This logistic advantage is thus associated with the improvement in the safety of the organic peroxide by the presence of the phlegmatizer (solvent or water).

Now, in certain applications, the presence of a solvent (in the case of an oil-type phlegmatizer) may present certain drawbacks during use, such as exudation, in particular when the peroxide is used in extrusion at high temperature or potential exudation (fogging) during the use of the polymer into which the organic peroxide is added.

This emulsion must remain stable without phase separation for at least two months of storage at room temperature.

At the present time, there is not available on the market an aqueous emulsion based on dialkyl peroxide which affords optimum safety for peroxides of this type and which is capable of industrial storage, i.e. without phase separation over a relatively long period (minimum interval of two months).

In the prior art, U.S. Pat. No. 3,988,261 discloses gelled aqueous emulsions of peroxides that must be stored in the cold, such as peresters or peroxydicarbonates, but the teaching of said patent does not concern dialkyl peroxides, which are peroxides of different nature.

Emulsions of dialkyl peroxides are envisaged in U.S. Pat. No. 4,440,885, but the physical state of the peroxide is solid, and this solid is then dissolved in a suitable solvent before being emulsified in water. Said document describes the use of three emulsifiers with an overall HLB ("hydrophilic-lipophilic balance") (HLB of the emulsion and not of the various components) of between 9 and 20, but these compositions are not stable beyond one week (phase separation of the emulsion). Moreover, this solvent gives rise to exudation problems over the extruders, as mentioned previously.

U.S. Pat. No. 7,943,685 describes a quite specific application in which a latex of elastomer and of an organic peroxide of dialkyl type is produced, an emulsifier of ionic type (sodium lauryl sulfate) and additives for crosslinking elastomers, methyl oleate sulfate and two zinc mercaptolu-imidazoles are used. In said document, the latex is prepared just before use, and the notion of stability without phase separation for several months is therefore not a criterion considered here.

WO 00/42078 discloses compositions of organic peroxide emulsions thus including dialkyl peroxides in the presence of a copolymer of an α, β-unsaturated dicarboxylic acid partially ethoxylated on the carboxylic acid function and of a $C_8$ to $C_{24}$ α-olefin and ethoxylated fatty alcohol. The examples cited in said document illustrate compositions based on peroxydicarbonates or peresters. Now, since the structure of dialkyl peroxides is intrinsically less polar than that of peresters or percarbonates, it is not possible for a person skilled in the art to extrapolate these results to dialkyl peroxides.

WO 01/32613 for its part claims the preparation of an emulsion of various organic peroxides by direct synthesis in emulsion of the peroxide concerned. The corresponding halides are emulsified. The examples given do not concern dialkyl peroxides, but peroxides typically used for the manufacture of PVC (peresters, peroxydicarbonates, diacyl peroxides). The emulsifiers used in this case are based on partially hydrolysed PVA, alkylcellulose ethers (such as methylcellulose or hydroxypropylcellulose), gelatin, polyvinylpyrrolidone, polyethoxylated sorbitan monolaurate and polyacrylic acid.

WO 2011/015567 discloses the composition of an aqueous emulsion of a peroxide with an active oxygen content of greater than or equal to 7% by weight. The examples in said document describe only the case of a particular diacyl peroxide, diisobutyryl peroxide, which is the only peroxide present in the examples. The object of said document consists in rendering safe and secure the transportation of organic peroxides that decompose rapidly, which is not an identical problem to the long-term (several months) stabilization of an aqueous emulsion that is ab initio transportable, i.e. non-hazardous. The object of said document consists in developing an emulsion for an organic peroxide that is intrinsically highly unstable and that could not be transported in pure form but only diluted (solvent or aqueous emulsion), which is not the case for all the peroxides described in said document since, in particular, it is known that a good number of dialkyl peroxides, although having a high content of active oxygen greater than 7% by weight, may be transported in pure form. As has been mentioned previously, the advantage of an emulsion of such dialkyl peroxides lies in more favourable conditions of use and/or storage than a product that is pure and/or diluted with solvent.

The problem thus lies here in searching for a dialkyl peroxide composition that is stable on storage at room temperature (no phase separation for at least two months).

Diisobutyryl peroxide is imperatively emulsified at low temperature according to the examples cited in WO 2011/015567 and is also stored at low temperature (below 0° C., more precisely at −25° C./−30° C. in the two examples). Now, a person skilled in the art knows perfectly that the temperature is a key parameter in the stabilization/destabilization of an emulsion. As indicated in the document "Techniques de l'Ingénieur—Procédés d'émulsification—Mécanisme de formation des emulsions" [Engineering techniques—Emulsification processes—Mechanism of formation of emulsions] by J. P. Canselier and M. Poux, document J2-152, published on 10 Jun. 2014, more precisely in paragraph 1.3.3, and also in example 1 of WO 2011/015567 in which a temperature increase to 35° C. destabilizes the emulsion, a temperature rise will have an influence on the solubility of the emulsifier in water, and thus on its residual concentration in the continuous phase, and will consequently have an influence on the surface tension of the interfacial zone.

Moreover, thermal agitation and Brownian motion are higher at positive than at negative temperature and encounter between droplets is thus facilitated, such that the stability of the emulsion will be decreased. It is also important to note the influence of the viscosity of the phases present and of the emulsion itself on the quality of the emulsion and on its stability, but an increase in temperature will tend to decrease its viscosity and therefore the creaming and flocculation phenomena may potentially be accelerated. As a result, the existing teaching for non-gelled organic peroxide emulsions stored at negative temperature is difficult to extrapolate to emulsions of organic peroxide, and especially of dialkyl peroxide, stored at room temperature.

In addition, it will be noted that diisobutyryl peroxide is a significantly more polar compound than dialkyl peroxides since it contains, in addition to the peroxide bond (oxygen-oxygen bond), polar groups of carbonyl type (acyl). Now, a person skilled in the art knows that the preparation of an oil-in-water emulsion of a less polar organic compound (in this case the dialkyl peroxide) will require a larger amount of energy or particularly efficient surfactants to sufficiently reduce the interfacial tension between the aqueous medium and the organic phase to obtain droplet sizes that are sufficiently fine and stable over the storage time.

Finally, the special feature of this emulsion is that the organic peroxide, which is too hazardous in pure form, is phlegmatized beforehand in a solvent and then emulsified. The composition of this emulsion is itself very close to that which is described in WO 03/095500.

JP 2001064312 is also known, which also discloses an emulsion of polar peroxides that are stable under cold temperature conditions (−15° C.). The five emulsions presented in the examples of said document all systematically comprise an antifreeze, a protective colloid (more precisely a polyvinyl acetate PVA) and an emulsifier. Moreover, the three peroxides of the examples—tert-butyl peroxyisobutyrate (Kayaester O), bis(3,5,5-trimethylhexanoyl) peroxide (Trigonox 36) and bis(2-ethylhexyl) peroxydicarbonate (Kayacarbon EH)—all have polar groups of carbonyl type (acyl, ester and/or carbonate) in addition to the oxygen-oxygen peroxide bond.

BRIEF DESCRIPTION OF THE INVENTION

It has been found that suspension agents such as partially hydrolysed polyvinyl acetate or cellulose derivatives do not allow, when they are used alone, the storage of dialkyl peroxides in aqueous emulsion in industrial storage (no phase demixing for at least two months).

Such suspension agents are, however, often used, on the other hand, for the emulsion stability of peroxydicarbonates, diacyl peroxides or peresters stored in the cold.

The Applicant has thus discovered, after various experiments and manipulations, that it is necessary to use a polyethoxylated nonionic surfactant, but that the nature of this nonionic emulsifier is important such that the objectives of the invention are not achieved with all types of nonionic emulsifiers. Thus, when used alone (a single emulsifier is used), nonionic emulsifiers such as partially hydrolysed polyvinyl acetate and/or cellulose derivative (pure celluloses cannot be used as emulsifier, in particular for this type of peroxide) do not fall within the context of the present invention.

To define what should be understood by the term "non-ionic surfactant", the Applicant refers to the 1995 article entitled "Tensioactifs" [Surfactants] by Chantal Larpent, published by "Les Techniques de l'Ingénieur".

Thus, the present invention relates to an aqueous emulsion of dialkyl peroxide consisting of:
  at least one dialkyl peroxide in liquid form at room temperature, representing between 10% and 75% by weight of the emulsion,
  at least one emulsifier representing from 0.01% to 10% by weight of the emulsion,
  optionally, at least one antifreeze,
  optionally, at least one functional additive,
  water, the amount of which is determined so as to form the rest of said emulsion (100%),
  characterized in that the emulsifier is a polyethoxylated nonionic surfactant.

It is understood here that the dialkyl peroxide is in liquid form at "room temperature", i.e. a temperature between 10° C. and 30° C. (Celsius), preferentially between 15° C. and 25° C.

By the term "ethoxylated nonionic surfactant", the aqueous emulsion according to the invention intends to exclude partially hydrolysed polyvinyl acetates (PVA), conventionally used at the present time for certain aqueous emulsions (based on peroxydicarbonates, peroxyesters and/or diacyl peroxide), and cellulose derivatives of the nonionic surfactant that may be used to satisfy the criteria of the invention since the Applicant has shown that, for these surfactants, used alone, the emulsions do not satisfy the essential criterion of industrial storage, in other words the emulsion containing such components undergoes phase separation within an interval of less than two months. On the other hand, their use as additive for the emulsion is not excluded from the limits of this invention, especially for adjusting the viscosity of the emulsion and in particular when it is desired to make it less fluid.

The term partially hydrolysed "polyvinyl acetates" means any derivative or component comprising at least one polyvinyl acetate function or being included in the family of polyvinyl acetates, and having a degree of hydrolysis of greater than or equal to 10 mol % and a viscosity at 20-23° C., as conventionally measured by a person skilled in the art (i.e. as a 4% aqueous solution in water or in a Brookfield RVT 3/20 viscometer), of greater than or equal to 1 mPas. These partially hydrolysed polyvinyl acetates may be chosen from block or random copolymers.

The term "cellulose derivatives" means components derived from cellulose known to those skilled in the art. Thus, cellulose derivatives are classified as a function of the type of chemical treatment as cellulose acetate, the main families of cellulose derivatives being cellulose ethers and cellulose esters.

As examples of such cellulose derivatives, mention will be made of methylcellulose (MC), hydroxyethylcellulose (HEC), carboxymethylcellulose (CMC) and methyl hydroxypropylcellulose (MHPC).

According to a particularly advantageous aspect, the aqueous emulsion according to the invention has an SADT (self-accelerating decomposition temperature) of greater than or equal to 50° C., preferably greater than or equal to 60° C.

It has been shown that the overall HLB (hydrophilic-lipophilic balance) of the emulsifier must be between 5 and 14, preferentially between 7 and 12 and even more preferentially between 9 and 10.

It will be noted that the antifreeze will be used when the aqueous emulsion is intended to be stored in the cold, conventionally in an environment in which the temperatures are below 0° C. The antifreeze then conventionally serves to prevent the formation of ice.

It is important to note that, from an industrial viewpoint, there is very great advantage in developing an emulsion of dialkyl peroxides that is stable for at least two months during storage at room temperature. The term "stability of the emulsion" means herein the presence of a single phase of milky appearance without the presence of a pure organic phase (degree of purity of greater than 60%), which would destroy the advantage of the emulsion especially with regard to its safety on storage.

Other characteristics and features of the primary mixture of the invention are presented below:
  preferably, the emulsifier consists of at least one sorbitan ester;
  advantageously, the emulsifier consists of a mixture of at least two sorbitan esters, preferably with an ethoxylated sorbitan ester;
  according to a possibility offered by the invention, the emulsifier consists of an ethoxylated plant oil, preferably a castor oil comprising from 10 to 20 mol of ethylene oxide, or a mixture of such an ethoxylated oil with a sorbitan ester, which itself is optionally ethoxylated;
  the dialkyl peroxide represents more than 40% by weight of the emulsion, preferably between 55% and 65% by weight of said emulsion;
  advantageously, the emulsifier represents between 1% and 3% by weight of the emulsion;
  preferably, the dialkyl peroxide consists of 2,5-dimethyl-2,5-di(tert-butylperoxy)hexane;
  in the case where the emulsifier consists of at least one sorbitan ester, said sorbitan ester consists of a monolaurate, monooleate or trioleate, monosteareate or tristearate of sorbitan and the ethoxylated structures thereof;
  also in this last case, the ethoxylated sorbitan ester has a degree of ethoxylation of less than or equal to 20 mol of ethylene oxide.

The invention also relates to a process for preparing the aqueous emulsion according to any one of the preceding claims, characterized in that it comprises the steps of:
  dispersing and homogenizing the emulsifier in water, and then
  adding the dialkyl peroxide to the aqueous emulsion, and then
  emulsifying the mixture thus made during an emulsification step at a temperature below 30° C., preferentially at a temperature of between 18° C. and 25° C.

The term "emulsified" means stirring or mixing, preferably using a stirrer rotating at at least 2000 rpm (revolutions per minute) or even more than 5000 rpm, the reaction medium or the medium into which the various components forming the emulsion according to the invention are introduced.

The invention also relates to a use of the aqueous emulsion as mentioned above, for:
  the crosslinking of elastomers, or
  the polymerization of ethylene derivatives or acrylic monomer derivatives alone or with other monomers.

Specifically, it is not excluded to use the dialkyl peroxide as described in the present invention in applications for the polymerization of ethylene derivatives or acrylic monomer derivatives alone or with other monomers, when the presence of water does not prohibit polymerization.

The description that follows is given solely for non-limiting illustrative purposes.

DETAILED DESCRIPTION OF THE INVENTION

As regards the dialkyl peroxide, it is in the following conventional crude forms:

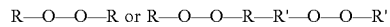

R—O—O—R or R—O—O—R—R'—O—O—R'

Thus, the branches R or R' may consist of aliphatic components (as is the case in the examples presented below), but also optionally of branches bearing aromatic or cyclic functions.

As examples of components belonging to the family of dialkyl peroxides, mention may be made especially of 2,5-dimethyl-2,5-di(tert-butylperoxy)-3-hexyne (Luperox® 130), di-tert-butyl peroxide (Luperox® DI), di-tert-amyl peroxide (Luperox® DTA), tert-butyl cumyl peroxide (Luperox® 801), di(tert-butylperoxy isopropyl)benzene (Luperox® F and Luperox® 802), 2,5-dimethyl-2,5-di(tert-butylperoxy)hexane (Luperox® 101), dicumyl peroxide (Luperox® DCP), 3,6,9-triethyl-3,6,9-trimethyl-1,4,7-triperoxonane (Trigonox® 301) and 3,3,5,7,7-pentamethyl-1,2,4-trioxepane (Trigonox® 311). A mixture of these peroxides obviously also forms part of the invention.

Hereinbelow, the examples of preparation of an aqueous emulsion in accordance with the invention all comprise 2,5-dimethyl-2,5-di(tert-butylperoxy)hexane, but it is clearly understood that other peroxides of the dialkyl peroxide family have been tested and show substantially similar results to those presented here with this peroxide.

As regards the emulsifier, it consists of a polyethoxylated nonionic agent. Partially hydrolysed PVAs and cellulose derivatives cannot be used alone in the context of this invention (as emulsifier), but their use as additives may optionally be envisaged.

Hereinbelow, the invention is presented with mainly at least one sorbitan ester, and also a composition with castor oil, but it is clearly understood that other polyethoxylated nonionic emulsifiers have been tested and show identical or substantially similar characteristics and properties to those presented herein.

It should moreover be noted that, in the examples of compositions according to the invention, two nonionic emulsifiers are present, but the Applicant has discovered that the objectives of the invention—namely, in particular, preparing an emulsion of dialkyl peroxide that is stable over time at room temperature—are achieved, or virtually achieved, when a single nonionic surfactant (excluding PVA or cellulose derivative) is used in the emulsion.

It has been found by the Applicant that examples of surfactants satisfying the criteria of the invention are chosen from ethoxylated alkylphenols, ethoxylated fatty alcohols, ethoxylated carboxylic acid esters, ethoxylated amides, ethoxylated fatty amines, copolymers bearing ethoxyl propoxyl blocks, ethoxylated (hydrogenated or non-hydrogenated) plant or animal oils, sorbitan esters and/or ethoxylated sorbitan esters, and ethoxylated glycerol esters.

The present invention has the additional advantage of affording the intended application the same level of performance as the dialkyl peroxide used in pure form.

As regards the antifreeze, optionally present in the emulsion, examples that may be mentioned include monoalcohols, diols and triols, such as methanol, ethanol, ethylene glycol, isopropanol, n-propanol, 1,2-propanediol, 1,3, propanediol, glycerol, 1-butanol, 2-butanol, 1,3-butanediol and 1,4-butanediol and mixtures thereof, these mixtures comprising at least two of the antifreezes listed previously, conventionally one of light alcohol type and the other of heavy alcohol type, advantageously a mixture of methanol and 1,2-propanediol.

The emulsion according to the invention may also comprise one or more functional additives intended to afford particular properties/characteristics to the polymer to which the peroxide is added.

Thus, as regards the additive, it may be chosen from antioxidants; UV-protecting agents; processing agents, whose function is to improve the final appearance during its use, such as fatty amides, stearic acid and salts thereof, ethylene bis-stearamide or fluorinated polymers; antifogging agents; antiblocking agents such as silica or talc; fillers such as calcium carbonate and nanofillers, for instance clays; coupling agents such as silanes; crosslinking agents such as peroxides; antistatic agents; nucleating agents; pigments; colourants; plasticizers; fluidizers and flame-retardant additives such as aluminum hydroxide or magnesium hydroxide.

The liquid aqueous emulsion of organic peroxide of the present invention may optionally also contain additives including pH modifiers such as phosphate and citrate buffers, chelating agents, biocides, for example fungicides, antiozonizers, antioxidants, antidegrading agents, swelling agents and mould-release agents.

The aqueous emulsion according to the invention may also comprise viscosity modifiers, such as PVAs (partially hydrolysed polyvinyl acetate) or cellulose derivatives.

Finally, the liquid aqueous emulsion of organic peroxide of the present invention may also contain additives usually used for stabilizing the organic peroxide or for delaying its decomposition, such as phlegmatizers (isododecane, mineral oil, etc.) or hydroperoxides.

These additives may be added in the amounts usually used and known to those skilled in the art. These additives are generally used in contents of between 10 ppm and 10 000 ppm by weight relative to the weight of the final polymer. The plasticizers, fluidizers and flame-retardant additives may reach amounts much higher than 10 000 ppm.

The object of the invention is not to specifically define the use of the emulsion, except for the uses specifically mentioned which are those more particularly targeted in the context of the present invention.

Example of Preparation of an Emulsion According to the Invention:

The preparation example presented below is in accordance with that which made it possible to prepare the test emulsions, but it is quite clear that a person skilled in the art manages to prepare the desired formulations by modifying the amounts given below.

The aqueous phase containing the emulsifier (also referred to as "surfactant") or the mixture of emulsifiers and water is stirred at between 500 and 1000 rpm (revolutions per minute) and maintained at 20-22° C. (Celsius). The dialkyl peroxide is added gradually to the reactor containing this water/surfactant mixture. Stirring is maintained for three minutes at 2000 rpm. The assembly is then stirred vigorously using an "Ultra Turrax type S-25N 18G" dispersion machine for two minutes at 9500 rpm (revolutions per minute), and then stirred using a paddle at 1000 rpm for one minute.

Each emulsion is prepared on 200 grams in total. The emulsion is stored in a closed polyethylene flask.

Starting Materials Used:

The dialkyl peroxide consists of Luperox® 101 from the company ARKEMA, which is 95% pure and 2,5-dimethyl-2,5-di(tert-butylperoxy)hexane.

The water used is conventionally distilled laboratory water.

The surfactants (emulsifiers) used will be specified in each example.

Tests Performed:

The droplet size ($d_{50}$) is determined via conventional means, which are well known to those skilled in the art, using the light scattering technique. The term $d_{50}$ corresponds to the mean diameter such that 50% of the volume of the droplets of organic peroxide in the aqueous emulsion has a diameter less than $d_{50}$. The measurements are taken using a Malvern Master Sizer 2000® machine at room temperature. The droplet size $d_{50}$ is given with an accuracy of ±0.5 µm (micrometer).

The flow time measurements are taken using consistometric cups according to standard DIN 53211 (viscosity cup diameter: 4 mm), which are well known to those skilled in the art. The measurement is taken on 100 grams of emulsion after conditioning at +5° C. The flow time measurements are expressed in seconds and the accuracy is ±10% of the indicated value. A value of less than 50 seconds reflects a fluid emulsion.

As regards the measurement of the phase separation (presence of two phases) or otherwise, the dialkyl peroxide emulsions are stored at a controlled temperature of 20±2° C. The visual phase separation mentioned in the examples is observed when an organic phase 0.2 mm thick is visible to the eye or when it is possible to observe a large drop of liquid at the bottom of the flask (reflecting non-uniformity and instability of the organic peroxide emulsion) or alternatively when two separate phases appear by phase separation. The emulsions are observed every day for the first week after preparation, and then every week for the first month after preparation, and then once a fortnight.

Results of the Tests on the Samples:

Table 1 below presents the test results for emulsions not in accordance with the definition of the invention.

All these emulsions comprise Luperox® 101 (2,5-dimethyl-2,5-di(tert-butylperoxy)hexane which represents 60% by weight of the emulsion, i.e. a molar concentration of Luperox® 101 at about 63% for all these compositions.

Each of these compositions is defined more precisely below:

Composition 1A: 1.2% by weight of polyvinyl acetate partially hydrolysed to 71-73%, Alcotex® 72.5 from Synthomer; HLB (hydrophilic-lipophilic balance)=11.5

Composition 1B: 2% by weight of polyvinyl acetate partially hydrolysed to 88%, Alcotex® 8804 from Synthomer; HLB=15.8

Composition 1C: 2% by weight of polyvinyl acetate partially hydrolysed to 54-57%, Alcotex® 552P from Synthomer; HLB=7.8

Composition 1D: 1.2% by weight of carboxymethylcellulose, Blanose 7M1C from Ashland Aqualon;

Composition 1E: 1.2% by weight of polyvinyl acetate partially hydrolysed to 71-73%, Alcotex® 72.5 and 1% by weight of sodium lauryl sulfate (SLS, Aldrich)

Composition 1F: 1.2% of sodium dodecylbenzene sulfate (Aldrich)

TABLE 1

| | 1A | 1B | 1C | 1D | 1E | 1F |
|---|---|---|---|---|---|---|
| $d_{50}$ (μm) | 14 | 8.5 | 19.6 | Emulsion not homogeneous at t = 0 | 3.8 | 17 |
| Storage time at which phase separation is observed | 2 days | 3 days | 3 days | | 1 day | 1 day |

It will thus be noted in particular that the emulsifiers tested here and cited in U.S. Pat. No. 4,440,885 and WO 01/32613 do not make it possible to obtain an emulsion that is stable during the storage time.

Table 1B below presents test results for organic peroxide emulsions prepared and stored at room temperature comprising surfactants typically used in the context of polar organic peroxides (those used in WO 2011/015567) for which the preparation and storage temperature of the emulsion is negative.

All these emulsions comprise Luperox® 101 (2,5-dimethyl-2,5-di(tert-butylperoxyhexane) which represents 60% by weight of the emulsion, i.e. a molar concentration of Luperox® 101 at about 63% for all these compositions.

Each of these compositions is more precisely defined below:

Composition 1BA: 0.8% by weight of polyvinyl acetate partially hydrolysed to 71-73%, Alcotex® 72.5 from the company Synthomer and 0.8% by weight of Brij® L23 from Aldrich (lauryl alcohol ethoxylated with 23 EO, HLB=16.9)

Composition 1BB: 1.2% by weight of polyvinyl acetate partially hydrolysed to 71-73%, Alcotex® 72.5 from the company Synthomer and 0.4% by weight of Brij® L23 from Aldrich (lauryl alcohol ethoxylated with 23 EO, HLB=16.9)

Composition 1BC: 0.8% by weight of polyvinyl acetate partially hydrolysed to 71-73%, Alcotex® 72.5 from the company Synthomer and 0.8% by weight of Brij® S100 from Aldrich (stearyl alcohol ethoxylated with 100 EO, HLB=18)

Composition 1BD: 1.2% by weight of polyvinyl acetate partially hydrolysed to 71-73%, Alcotex® 72.5 from the company Synthomer and 0.4% by weight of Brij® S100 from Aldrich (stearyl alcohol ethoxylated with 100 EO, HLB=18)

TABLE 1B

| | 1BA | 1BB | 1BC | 1BD |
|---|---|---|---|---|
| d50 (μm) | 9.7 | 8.1 | 13.9 | 11.5 |
| Storage time in which phase separation is observed | 3 days | 3 days | 3 days | 7 days |

It will be noted that the emulsifiers tested (PVA+ethoxylated fatty alcohol) here and included in the composition of the emulsion of example 1 of patent WO 2011/015567 do not make it possible to obtain a dialkyl peroxide emulsion whose stability exceeds one week.

Table 2 below presents the test results for emulsions in accordance with the definition of the invention.

All these emulsions comprise Luperox® 101 (2,5-dimethyl-2,5-di(tert-butylperoxy)hexane which represents 60% by weight of the emulsion, i.e. a molar concentration of Luperox® 101 at about 63% for all these compositions, except for composition 2G which contains 70% by weight of Luperox® 101.

Each of these compositions is defined more precisely below:

Composition 2A: 0.8% by weight of sorbitan trioleate containing 20 mol of ethylene oxide (Tween 85, HLB=10.5) and 0.8% by weight of sorbitan monooleate (Span 80, HLB=4.3); overall HLB=7.4

Composition 2B: 0.8% by weight of sorbitan monooleate containing 20 mol of ethylene oxide (Tween 80, HLB=15) and 0.8% by weight of sorbitan monooleate (Span 80, HLB=4.3); overall HLB=9.65

Composition 2C: 0.2% by weight of sorbitan monolaurate containing 20 mol of ethylene oxide (Tween 20, HLB=16.7) and 1.4% by weight of sorbitan monolaurate (Span 20, HLB=8.6); overall HLB=9.6

Composition 2D: 1.4% by weight of sorbitan trioleate containing 20 mol of ethylene oxide (Tween 85, HLB=10.5) and 0.2% by weight of sorbitan monolaurate (Span 80, HLB=4.3); overall HLB=9.7

Composition 2E: 0.9% by weight of sorbitan trioleate containing 20 mol of ethylene oxide (Tween 85, HLB=10.5) and 0.7% of sorbitan monolaurate (Span 20, HLB=8.6); overall HLB=9.7

Composition 2F: 1.2% by weight of ethoxylated castor oil containing 20 mol of ethylene oxide (Surfaline® R20, HLB=9.5) and 1% by weight of ethoxylated castor oil containing 12 mol of ethylene oxide (Decohfix® CO70, HLB=8.2);

Composition 2G: emulsion containing 70% by weight of Luperox® 101 and 0.8% by weight of sorbitan monooleate containing 20 mol of ethylene oxide (Tween 80, HLB=15) and 0.8% by weight of sorbitan monooleate (Span 80, HLB=4.3); overall HLB=9.65

TABLE 2

|  | 2A | 2B | 2C | 2D | 2E | 2F | 2G |
|---|---|---|---|---|---|---|---|
| Flow time (s) | 17 | 17 | 15 | 17 | 14 | 19 | 24 |
| $d_{50}$ (μm) at t = 0 | 12.0 | 10.4 | 9.1 | 9.8 | 10.0 | 10.0 | 10.2 |
| Storage time at which phase separation is observed | 3.5 months | ≥4 months | 3.5 months | 3.5 months | 3.5 months | 2.5 months | 2 months |
| $d_{50}$ (μm) t = 2 months | 11.0 | 8.6 | 8.0 | 8.2 | 9.3 | 9.8 | 11.8 |

Table 3 below presents the results for compositions 2A, 2B, 2C, 2D and 2E concerning the droplet size $d_{50}$ more precisely during the storage time.

TABLE 3

|  | 2A | 2B | 2C | 2D | 2E |
|---|---|---|---|---|---|
| t = 0 $d_{50}$ (μm) | 12.0 | 10.4 | 9.1 | 9.8 | 10.0 |
| t = 1 month $d_{50}$ (μm) | 11.0 | 12.5 | 8.1 | 8.4 | 8.3 |
| t = 2 months $d_{50}$ (μm) | 11.0 | 8.6 | 8.0 | 8.2 | 9.3 |
| t = 3 months $d_{50}$ (μm) | 11.5 | 8.4 | 8.0 | 7.7 | 9.0 |

The invention claimed is:

1. Aqueous emulsion of dialkyl peroxide consisting of:
at least one dialkyl peroxide in liquid form at room temperature, representing between 10% and 75% by weight of the emulsion,
at least one emulsifier representing from 0.01% to 10% by weight of the emulsion,
optionally, at least one antifreeze,
optionally at least one functional additive,
water, the amount of which is determined so as to form the rest of said emulsion (100%),
wherein the emulsifier is a polyethoxylated nonionic surfactant chosen from the group consisting of ethoxylated carboxylic acid esters, ethoxylated amides, ethoxylated fatty amines, ethoxylated, hydrogenated or non-hydrogenated, plant or animal oils, ethoxylated sorbitan esters, ethoxylated glycerol esters, and combinations thereof, optionally in combination with at least an unethoxylated sorbitan ester, and
wherein the overall HLB (hydrophilic-lipophilic balance) of the emulsifier is between 5 and 12.

2. Emulsion according to claim 1, wherein the emulsifier consists of a mixture of an unethoxylated sorbitan ester with an ethoxylated sorbitan ester.

3. Emulsion according to claim 1, wherein the emulsifier consists of an ethoxylated plant oil.

4. Emulsion according to claim 1, wherein the dialkyl peroxide represents more than 40% by weight of the emulsion.

5. Emulsion according to claim 1, wherein the emulsifier represents between 1% and 3% by weight of the emulsion.

6. Emulsion according to claim 1, wherein the dialkyl peroxide consists of 2,5-dimethyl-2,5-di(tert-butylperoxy) hexane.

7. Emulsion according to claim 2, wherein
the unethoxylated sorbitan ester is chosen from the group consisting of a monolaurate of sorbitan, a monooleate of sorbitan, a trioleate of sorbitan, a monostearate of sorbitan, and a tristearate of sorbitan, and
the ethoxylated sorbitan ester is chosen from the group consisting of ethoxylated structures thereof of a monolaurate of sorbitan, a monooleate of sorbitan, a trioleate of sorbitan, a monostearate of sorbitan and a tristearate of sorbitan.

8. Emulsion according to claim 1, wherein the ethoxylated sorbitan ester has a degree of ethoxylation of less than or equal to 20 mol of ethylene oxide.

9. Process for preparing the aqueous emulsion according to claim 1, wherein the emulsion process comprises the steps of:
dispersing and homogenizing the emulsifier in water, and then
adding the dialkyl peroxide to the emulsifier in water aqueous emulsion, and then
emulsifying the mixture thus made during an emulsification step at a temperature below 30° C.

10. Emulsion according to claim 1, wherein the overall HLB of the emulsifier is between 7 and 12.

11. Emulsion according to claim 1, wherein the overall HLB of the emulsifier is between 9 and 10.

12. Process for crosslinking of elastomers, comprising the crosslinking of elastomers in the presence of the aqueous emulsion according to claim 1.

13. Process for polymerizing ethylene derivatives or acrylic monomer derivatives alone or with other monomers, comprising the polymerization of ethylene derivatives or acrylic monomer derivatives alone or with other monomers in the presence of the aqueous emulsion according to claim 1.

* * * * *